(12) United States Patent
Egawa et al.

(10) Patent No.: US 8,540,374 B2
(45) Date of Patent: Sep. 24, 2013

(54) COOLING ARRANGEMENT FOR PROJECTOR WITH OPTICAL MODULATION DEVICES

(75) Inventors: Akira Egawa, Nagano-ken (JP);
Yasushi Tateno, Nagano-ken (JP);
Fumihide Sasaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 290 days.

(21) Appl. No.: 13/072,045

(22) Filed: Mar. 25, 2011

(65) Prior Publication Data

US 2011/0234992 A1   Sep. 29, 2011

(30) Foreign Application Priority Data

Mar. 29, 2010  (JP) .................................. 2010-075013

(51) Int. Cl.
*G03B 21/16*   (2006.01)

(52) U.S. Cl.
USPC .................................. 353/61; 353/57; 353/60

(58) Field of Classification Search
USPC ......................................... 353/61, 52, 57, 60
See application file for complete search history.

(56) References Cited

U.S. PATENT DOCUMENTS

| 7,073,912 B2 * | 7/2006 | Yanagisawa et al. ........... 353/61 |
| 7,393,109 B2 * | 7/2008 | Arboix ............................. 353/57 |
| 2006/0268239 A1 * | 11/2006 | Nasu et al. ....................... 353/57 |
| 2011/0019159 A1 | 1/2011 | Egawa et al. |
| 2011/0025984 A1 | 2/2011 | Takagi et al. |
| 2011/0032486 A1 | 2/2011 | Egawa et al. |

FOREIGN PATENT DOCUMENTS

| JP | 2001-188305 | 7/2001 |
| JP | 2001-281613 | 10/2001 |

* cited by examiner

*Primary Examiner* — Georgia Y Epps
*Assistant Examiner* — Magda Cruz

(57) ABSTRACT

A projector includes: an optical modulation device configured to modulate an incident luminous flux; a projection optical device configured to project the luminous flux modulated by the optical modulation device; and a cooling device configured to cool the optical modulation device, wherein the cooling device includes a cooling fan, and a duct having a discharge portion that causes the air discharged from the cooling fan to circulate in a direction approximately parallel to the optical axis, and discharges it to a lateral side of the optical modulation device, and the duct is disposed in a state that, when the projection optical device and discharge portion are cut by a plane perpendicular to the optical axis, the height position of a first center between the upper end and lower end of the cross-section of the discharge portion and that of the optical axis differ from one another.

5 Claims, 5 Drawing Sheets

COOLING ARRANGEMENT FOR PROJECTOR WITH OPTICAL MODULATION DEVICES

CROSS-REFERENCE

The entire disclosure of Japanese Patent Application No. 2010-075013 filed Mar. 29, 2010 is expressly incorporated by reference herein.

BACKGROUND

1. Technical Field

The present invention relates to a projector.

2. Related Art

To date, a projector including three optical modulation devices such as liquid crystal panels, a color synthesis optical device (a cross dichroic prism) which synthesizes color lights modulated by the corresponding optical modulation devices, and a projection optical device (a projection lens) which projects a synthesized light, has been known (for example, refer to JP-A-2001-281613).

In the projector described in JP-A-2001-281613, in order to cool the optical modulation devices, a sirocco fan is disposed adjacent to the projection optical device in such a way as to discharge air in a direction approximately parallel to a lens optical axis of the projection optical device.

Then, the air discharged from the sirocco fan is caused to blow on a lateral side of the optical modulation device (hereafter, a first optical modulation device) disposed in a state that the luminous flux incidence side end face is approximately parallel to the lens optical axis, and circulates through the light incidence side and light emission side of the first optical modulation device, cooling the first optical modulation device.

In JP-A-2001-281613, the projection optical device and color synthesis optical device are set to have approximately the same left-right direction length dimension in plan view from the upper side. That is, as the first optical modulation device is disposed in a position away from the projection optical device when seen from a projection side, it is possible to cause the air from the sirocco fan to blow on the lateral side of the first optical modulation device from the direction approximately parallel to the lens optical axis by disposing the sirocco fan in the way heretofore described.

However, as a miniaturization of the optical modulation devices and color synthesis optical device has been promoted in recent years, the first optical modulation device is disposed in a position hidden by the projection optical device when seen from the projection side. For this reason, in the existing situation in which the miniaturization has been promoted, even though the sirocco fan is disposed in the way heretofore described, it is not possible to cause the air from the sirocco fan to blow on the lateral side of the first optical modulation device from the direction approximately parallel to the lens optical axis.

Then, in order to cause the air from the sirocco fan to blow on the lateral side of the first optical modulation device, it is conceivable that a direction of discharge of the air from the sirocco fan is inclined at a predetermined angle with respect to the lens optical axis in plan view from the upper side.

However, when the direction of discharge is inclined in the way heretofore described, even though the air is caused to blow on the lateral side of the first optical modulation device, it is difficult for the air to enter the light incidence side (between the color synthesis optical device and first optical modulation device) of the first optical modulation device, reducing the efficiency of cooling the first optical modulation device.

SUMMARY

An advantage of some aspects of the invention is to provide a projector of which an optical modulation device can be effectively cooled.

A projector according to an aspect of the invention includes an optical modulation device configured to modulate an incident luminous flux, a projection optical device configured to project the luminous flux modulated by the optical modulation device, and a cooling device configured to cool the optical modulation device. The optical modulation device is disposed in a state that a luminous flux incidence side end face of the optical modulation device is approximately parallel to an optical axis of the projection optical device. The cooling device includes a cooling fan configured to suction and discharges air, and a duct having a discharge portion that causes the air discharged from the cooling fan to circulate in a direction approximately parallel to the optical axis, and discharges it to a lateral side of the optical modulation device. The duct is disposed in a state that, when the projection optical device and discharge portion are cut by a plane perpendicular to the optical axis, the height position of a first center between the upper end and lower end of the cross-section of the discharge portion, and that of the optical axis, differ from one another.

Herein, the lateral side of the optical modulation device means an end portion of the optical modulation device on a projection side onto which the luminous flux is projected from the projection optical device.

According to the aspect of the invention, the duct configuring the cooling device is disposed in a state that the height position (for example, the height position from a bottom surface portion of an exterior housing) of the first center of the discharge portion that causes the air to circulate in the direction approximately parallel to the optical axis of the projection optical device, and discharges the air to the lateral side of the optical modulation device, and that of the optical axis of the projection optical device, differ from one another.

Because of this, it is possible to dispose the discharge portion in a space on the obliquely upward side or obliquely downward side of the projection optical device, as seen from the projection side, utilizing the fact that the projection optical device has an approximately cylindrical shape extending along the optical axis of the projection optical device. For this reason, it is possible to bring the discharge portion closer to the optical axis of the projection optical device, in plan view from the upper side, in comparison with a configuration wherein the duct is disposed in a state that the height positions of the first center and the optical axis of the projection optical device approximately coincide with each other.

Consequently, even when the optical modulation device is disposed in a position hidden by the projection optical device as seen from the projection side due to a miniaturization of the optical modulation device or the like, it is possible to cause the air after circulating through the discharge portion to blow on the lateral side of the optical modulation device, and thereby cause the air to circulate smoothly through both the light incidence side and light emission side of the optical modulation device, and it is possible to effectively cool the optical modulation device.

With the projector according to the aspect of the invention, it is preferable that a side wall portion following the external shape of the projection optical device is provided in the duct.

According to the aspect of the invention, as the side wall portion is provided in the duct, it is possible to bring the discharge portion still closer to the optical axis of the projection optical device, in plan view from the upper side, in comparison with a configuration wherein the side wall portion is not provided in the duct (for example, a configuration having a rectangular external shape). For this reason, it is possible to efficiently feed the air to the light incidence side of the optical modulation device, and it is possible to more effectively cool the optical modulation device.

Also, by forming the side wall portion in such a way as to follow the external shape of the projection optical device, it is possible to increase the flow channel cross-sectional area of the duct, and it is possible to sufficiently secure the flow rate of air caused to blow on the lateral side of the optical modulation device. For this reason, it is possible to more effectively cool the optical modulation device.

With the projector according to the aspect of the invention, it is preferable that the cooling fan is disposed in a state that, when a discharge aperture from which air is discharged is cut by a plane perpendicular to the optical axis, the height position of a second center between the upper end and lower end of the cross-section of the discharge aperture and that of the first center approximately coincide with each other.

According to the aspect of the invention, as the cooling fan configuring the cooling device is disposed in the way heretofore described, it is not necessary to form a region of the duct, which introduces the air from the cooling fan into the discharge portion, in a bent shape. That is, as it is possible to set a flow channel in the region to be approximately linear, it is possible to reduce a loss of pressure in the region, and sufficiently secure the volume of air caused to blow on the lateral side of the optical modulation device, and it is possible to more effectively cool the optical modulation device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
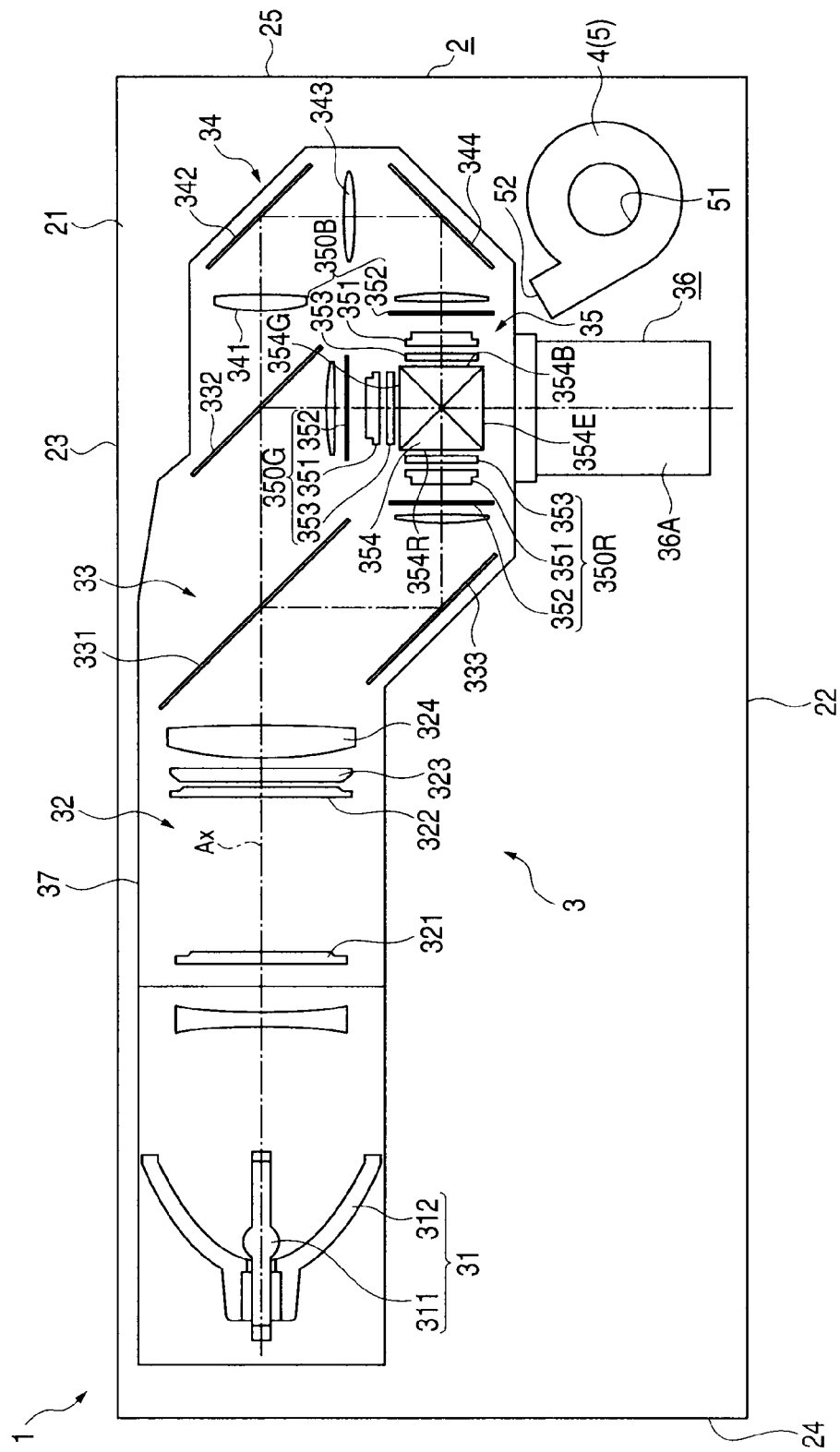
FIG. 1 is a plan view schematically showing an internal configuration of a projector according to an embodiment.

Hereafter, a description will be given, based on the drawings, of one embodiment of the invention.
Configuration of Projector FIG. 1 is a plan view schematically showing an internal configuration of a projector 1.

Hereafter, for ease of description, a side on which is disposed a projection lens 36, to be described hereafter, is taken to be a "front", and the opposite side is taken to be a "back".

The projector 1 modulates luminous fluxes in accordance with image information, and projects them onto a screen (not shown). The projector 1, as shown in FIG. 1, includes an exterior housing 2 configuring an exterior, and an optical unit 3 and cooling device 4 (of which only one component member (a cooling fan 5) is shown in FIG. 1) disposed inside the exterior housing 2.
Configuration of Exterior Housing The exterior housing 2 includes a top surface portion (not shown), a bottom surface portion 21, and side surface portions 22 to 25 (hereafter, the side surface portion on the front side is a front surface portion 22, and the side surface portion on the back side is a back surface portion 23), as shown in FIG. 1, and has an approximately rectangular parallelepiped shape.
Configuration of Optical Unit The optical unit 3, modulating luminous fluxes in accordance with the image information (an image signal) and projecting them, has an approximate L-shape in plan view which extends along the back surface portion 23, and also, one end side of which extends toward the front surface portion 22, as shown in FIG. 1.

The optical unit 3, as shown in FIG. 1, includes a light source device 31 having a light source lamp 311 and a reflector 312, an illumination optical device 32 having lens arrays 321 and 322, a polarization conversion element 323, and a superimposing lens 324, a color separation optical device 33 having dichroic mirrors 331 and 332 and a reflecting mirror 333, a relay optical device 34 having an incidence side lens 341, a relay lens 343, and reflecting mirrors 342 and 344, an optical device 35 having three liquid crystal panels 351 as optical modulation devices, three incidence side polarizing plates 352, three emission side polarizing plates 353, and a cross dichroic prism 354 as a color synthesis optical device, the projection lens 36 as a projection optical device, and an optical component housing 37 which, as well as having the members 31 to 35 disposed in predetermined positions on an illumination optical axis Ax set inside it, supports the projection lens 36.

Then, in the optical unit 3, with the heretofore described configuration, luminous fluxes emitted from the light source device 31 and going through the illumination optical device 32 are separated into three color lights R, G, and B by the color separation optical device 33. Also, the individual color lights separated are modulated in accordance with the image information by the corresponding liquid crystal panels 351. The individual color lights modulated are synthesized by the prism 354, and projected onto the screen by the projection lens 36.

In FIG. 1, for ease of description, the liquid crystal panel 351, incidence side polarizing plate 352, and emission side polarizing plate 353 on an R color light side are taken to be an R side member 350R, and those on a G color light side and those on a B color light side are taken to be a G side member 350G and B side member 350B in the same way. The same applies in the subsequent diagrams too.

In the embodiment, the projection lens 36, having a cylindrical lens barrel 36A, is configured in such a way that the diameter thereof is larger than the left-right direction length dimension of the prism 354 (the distance dimension between an R color light incidence side end face 354R (FIG. 1) and a B color light incidence side end face 354B (FIG. 1)). Also, the projection lens 36 is disposed in a state that a lens optical axis OAx is in a position away from the illumination optical axis Ax (an approximately central position of an emission side end face 354E (FIG. 1) of the prism 354 which emits a synthesized image) to the upper side (refer to FIG. 4). That is, the image synthesized by the prism 354 falls incident on a lower side lens region of the projection lens 36, and is projected to the upper side by the lower side lens region (a shifting projection).

Figure 4:
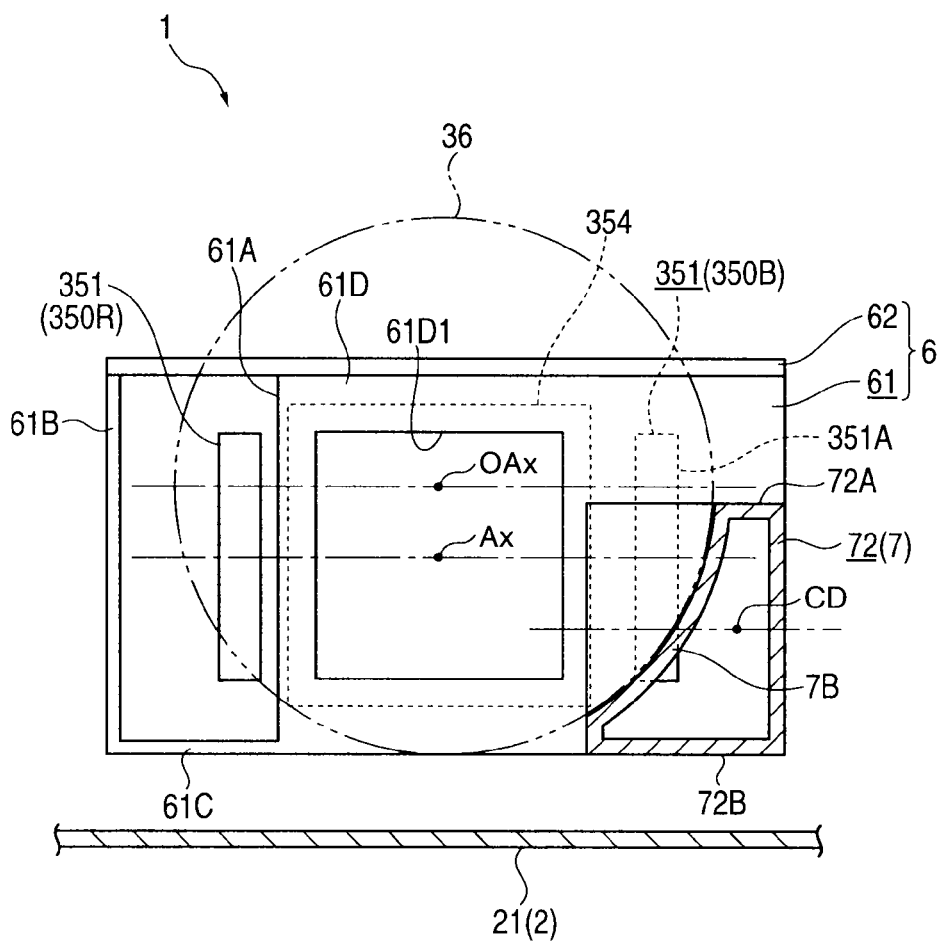
FIG. 4 is a diagram schematically showing a disposition position of a discharge portion according to the embodiment.

Then, because of the heretofore described configuration of the projection lens 36, the B color light side liquid crystal panel 351 is disposed in a state that the disposition position thereof is superimposed on the disposition position of the projection lens 36 as seen from the front side, and hidden by the projection lens 36 (refer to FIG. 4).

Configuration of Cooling Device

Figure 2:
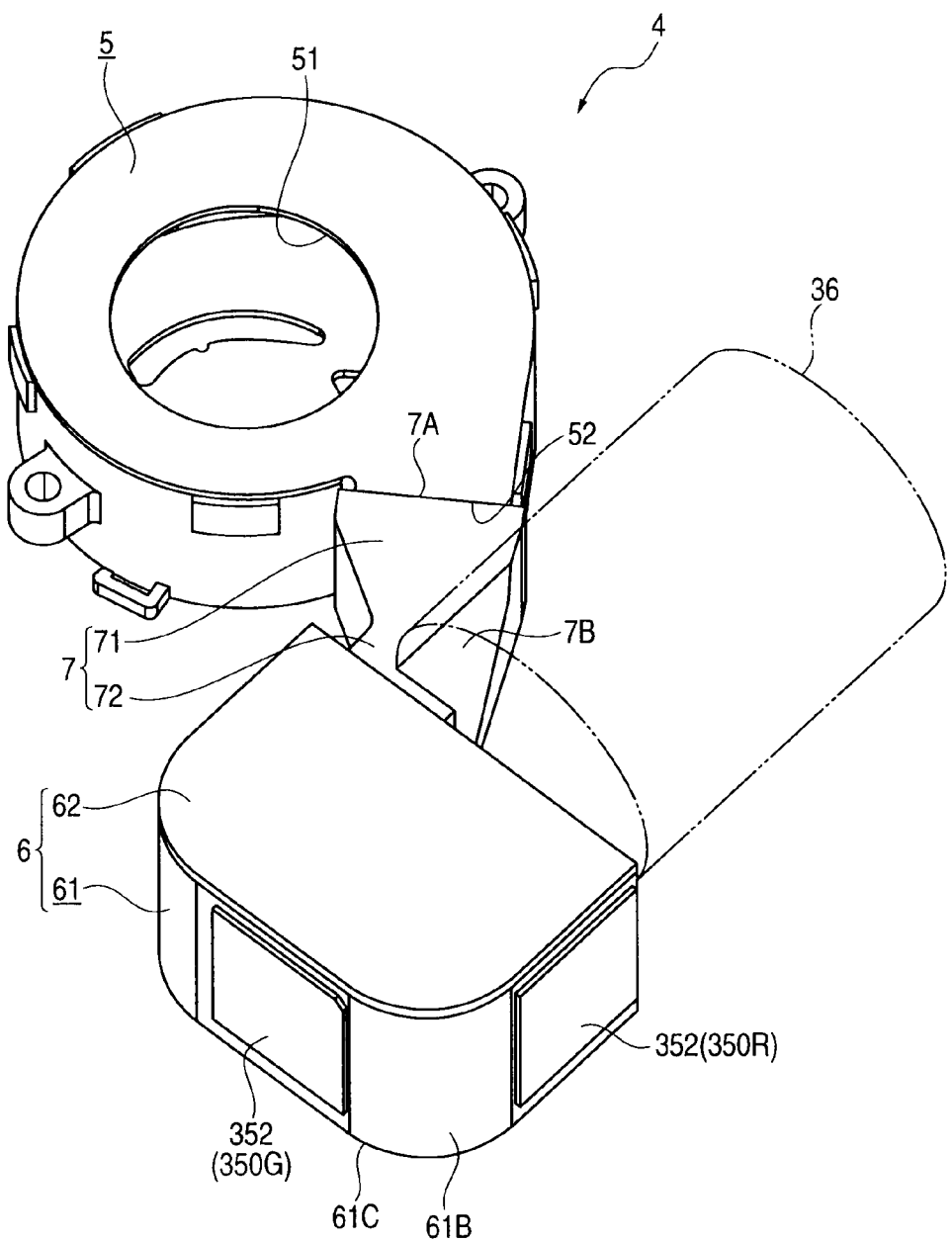
FIG. 2 is a diagram schematically showing a configuration of a cooling device according to the embodiment.
Figure 3:
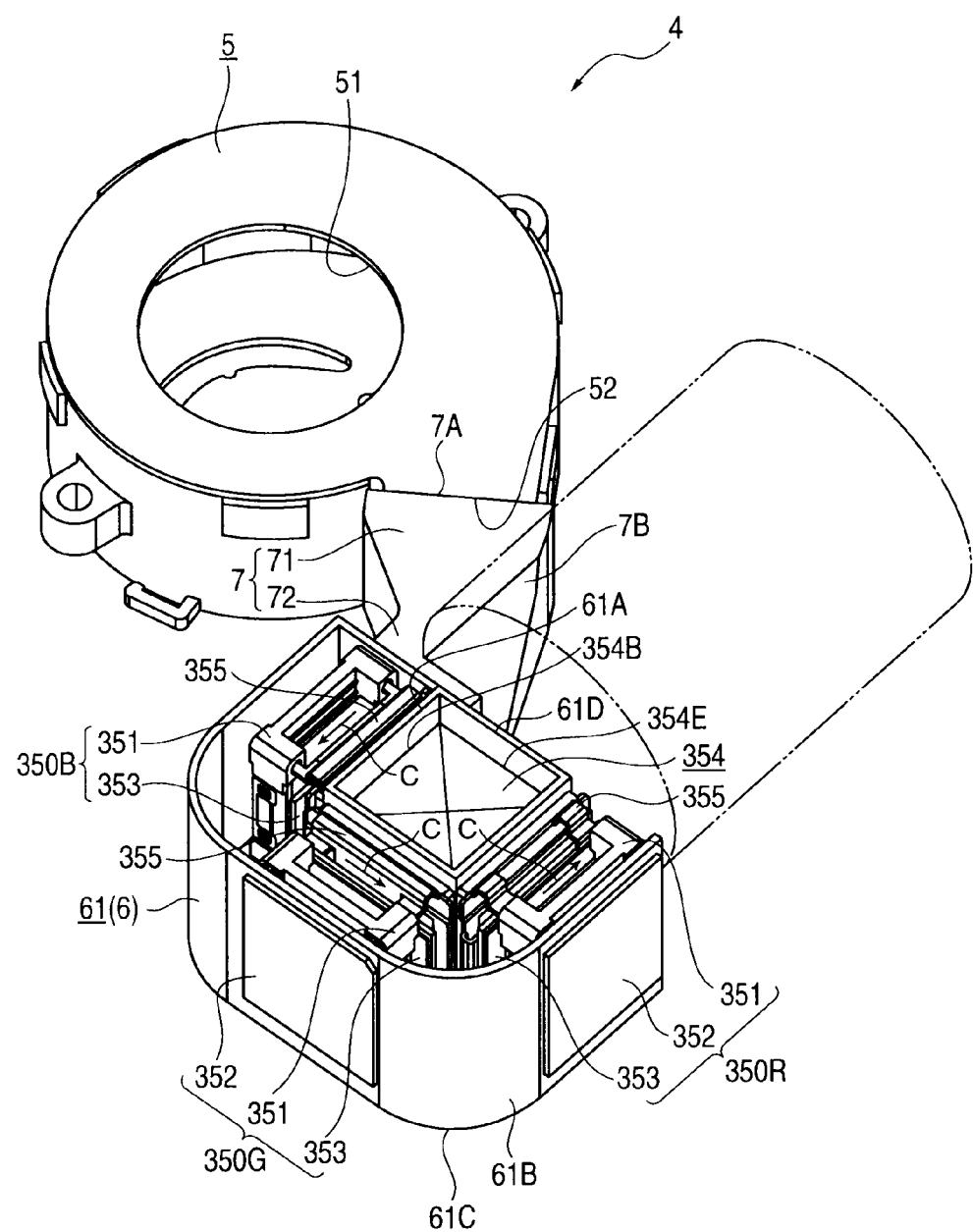
FIG. 3 is a diagram schematically showing a configuration of the cooling device according to the embodiment.

FIGS. 2 and 3 are diagrams schematically showing a configuration of the cooling device 4. Specifically, FIG. 2 is a perspective view of the cooling device 4 seen from the back and upper side, and FIG. 3 is a diagram when a lid body 62 is removed from the cooling device 4 of FIG. 2.

The cooling device 4, being provided adjacent to the projection lens 36, as shown in FIG. 1, causes air to blow on the optical device 35, and cools the optical device 35. The cooling device 4 includes the cooling fan 5, a flow channel formation portion 6 (FIGS. 2 and 3), and a duct 7 (FIGS. 2 and 3), as shown in FIGS. 1 to 3.

Configuration of Cooling Fan

The cooling fan 5, being configured of a so-called sirocco fan having a plurality of blades bent forward with respect to a fan rotation direction, is disposed to the right side of the projection lens 36 as seen from the front side, as shown in FIGS. 1 to 3.

More specifically, as shown in FIGS. 1 to 3, the cooling fan 5 is disposed in a state that a suction aperture 51 through which air is suctioned faces the upper side (the top surface side of the exterior housing 2), and a discharge aperture 52 from which air is discharged faces diagonally backward and left (an air discharge direction is inclined at a predetermined angle (for example, 45 degrees) with respect to the lens optical axis OAx) as seen from the front side.

Details of the disposition position of the cooling fan 5 will be described hereafter.

Configuration of Flow Channel Formation Portion

The flow channel formation portion 6 causes air discharged from the cooling fan 5 and going through the duct 7 to circulate through the B side member 350B, G side member 350G, and R side member 350R in this order. The flow channel formation portion 6 includes a main body portion 61 and the lid body 62 (FIG. 2), as shown in FIG. 2 or 3.

The main body portion 61 is formed into a container having an inner peripheral wall 61A (FIG. 3), an outer peripheral wall 61B, and bottom wall 61C, as shown in FIG. 2 or 3.

The inner peripheral wall 61A has an approximate U-shape in plan view which surrounds the incidence side end faces 354R, 354G, and 354B (FIGS. 1 and 3) of the prism 354 on which the R, G, and B color lights fall incident respectively.

Although a specific illustration is omitted, three opening portions for causing the corresponding R, G, and B color lights going through the respective members 350R, 350G, and 350B to fall incident on the prism 354 are formed in the inner peripheral wall 61A.

Then, as shown in FIG. 3, the liquid crystal panel 351 and emission side polarizing plate 353 are mounted on the inner peripheral wall 61A via a support member 355 in such a way as to oppose each corresponding incidence side end face 354R, 354G, and 354B.

The front side end portions of the inner peripheral wall 61A are connected together by a connecting wall 61D (FIG. 3) in such a way as to cover the emission side end face 354E (FIGS. 1 and 3) of the prism 354 from which the synchronized image is emitted.

An opening portion 61D1 (refer to FIGS. 4 and 5) for causing light synchronized by the prism 354 to pass through is formed in the connecting wall 61D.

The connecting wall 61D has a function of allowing only the light synchronized by the prism 354 to pass through the opening portion 61D1, blocking unnecessary light (leaked light), and preventing it from falling incident on the projection lens 36.

The outer peripheral wall 61B, being positioned on the R, G, and B incidence sides of the inner peripheral wall 61A, has an approximate U-shape in plan view which is approximately parallel to the inner peripheral wall 61A.

Although a specific illustration is omitted, three opening portions for causing the corresponding R, G, and B color lights going through the respective incidence side polarizing plates 352 to pass through are formed in the outer peripheral wall 61B.

Then, as shown in FIG. 2 or 3, the three incidence side polarizing plates 352 are mounted on the outer peripheral wall 61B in such a way as to close the three corresponding opening portions.

The bottom wall 61C connects the bottom surface portion 21 side end portions of the inner peripheral wall 61A and outer peripheral wall 61B together.

Then, the main body portion 61, by the upper side thereof being closed by the lid body 62, causes the air discharged from the cooling fan 5 and going through the duct 7 to circulate in a horizontal direction along a flow channel C (FIG. 3) with an approximate U-shape in plan view. That is, the main body portion 61 causes the air to circulate through the B side member 350B, G side member 350G, and R side member 350R in this order, along the flow channel C with the approximate U-shape in plan view, with the circulation through each member 350R, 350G, and 350B starting from a lateral side thereof. The air following the flow channel C circulates through the light incidence side and light emission side of each liquid crystal panel 351, and cools each member 350R, 350G, and 350B.

Configuration of Duct

The duct 7 introduces the air discharged from the cooling fan 5 into the flow channel formation portion 6. As shown in FIG. 2 or 3, the duct 7 is configured of a cylindrical body with an approximately rectangular shape in cross-section wherein an introduction portion 71 and a discharge portion 72 are integrated.

As shown in FIG. 2 or 3, the introduction portion 71, of which an introduction aperture 7A for introducing air outside the duct 7 into the inside is connected to the discharge aperture 52 of the cooling fan 5, is formed in such a way as to extend in an approximately horizontal direction along a direction of discharge of air from the discharge aperture 52 in plan view from the upper side.

As shown in FIG. 2 or 3, the discharge portion 72, being connected to the flow channel downstream side of the introduction portion 71, is formed in such a way as to extend approximately parallel to the lens optical axis OAx (refer to FIG. 4) of the projection lens 36 in plan view from the upper side. Also, the discharge portion 72 is such that a discharge aperture (not shown) for discharging air inside the duct 7 to the outside is connected to the front side of the disposition position of the B side member 350B in the flow channel formation portion 6, and communicates with the inside of the flow channel formation portion 6.

That is, the discharge portion 72 causes the air to blow on a lateral side (the front side (projection side) end portion of the liquid crystal panel 351) of the liquid crystal panel 351 (B side member 350B) whose luminous flux incidence side end face 351A (refer to FIG. 4) is approximately parallel to the lens optical axis OAx.

Disposition Position of Duct

FIG. 4 is a diagram schematically showing a disposition position of the discharge portion 72. Specifically, FIG. 4 is a sectional view of the projection lens 36 and discharge portion 72 cut by a plane perpendicular to the lens optical axis OAx, as seen from the front side.

In FIG. 4, for ease of description, the polarizing plates 352 and 353 are omitted from the illustration.

The discharge portion 72, as shown in FIG. 4, is disposed in a state that, when the projection lens 36 and discharge portion 72 are cut by the plane perpendicular to the lens optical axis OAx, the height position (the height position from the bottom portion 21) of a first center CD between an upper end 72A and lower end 72B of the cross-section of the discharge portion 72, and that of the lens optical axis OAx, differ from one another.

More specifically, the discharge position 72 is disposed in a state that the height position of the first center CD is lower than the height position of the lens optical axis OAx.

Also, the discharge portion 72 is disposed in a state that the height position of the first center CD is lower than the height position of the illumination optical axis Ax (an approximately central position of the liquid crystal panel 351), as shown in FIG. 4.

In the duct 7 heretofore described, as shown in FIGS. 2 to 4, a side wall portion 7B following the external shape of the projection lens 36 (lens barrel 36A) is formed in a corner portion on the upper left side as seen from the front side.

That is, the duct 7 is disposed in a condition in which the side wall portion 7B is in abutment with the outer periphery of the projection lens 36, and in close contact with the projection lens 36 on the diagonally downward right side as seen from the front side.

Disposition Position of Cooling Fan

Figure 5:
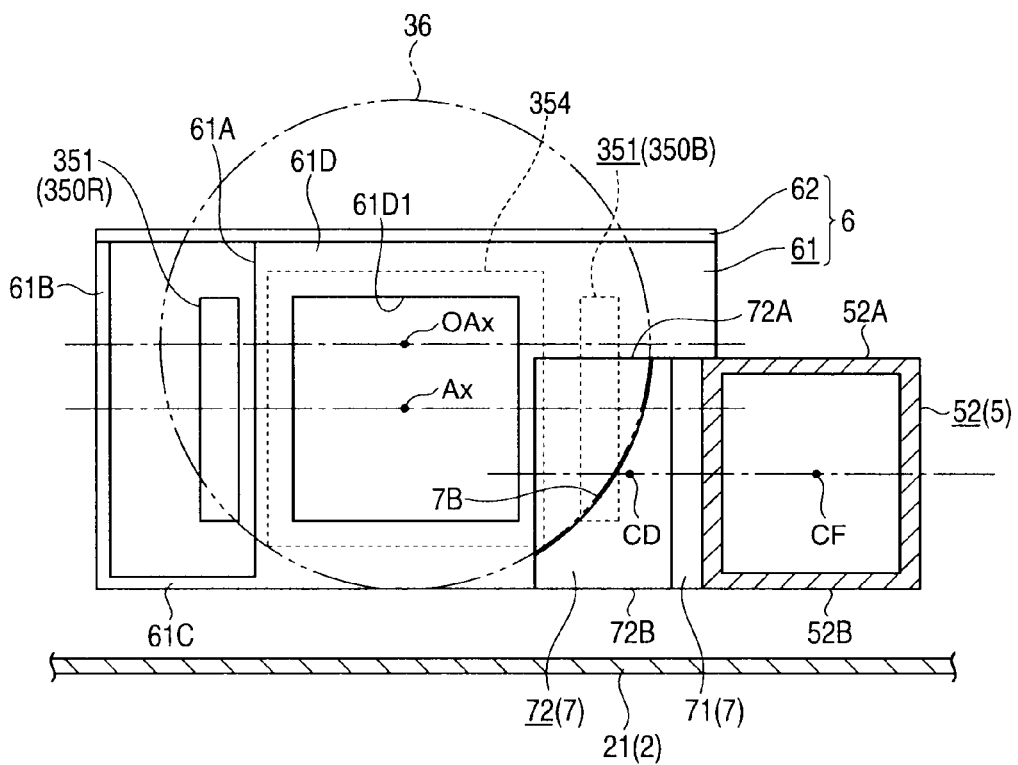
FIG. 5 is a diagram schematically showing a disposition position of a cooling fan according to the embodiment.

FIG. 5 is a diagram schematically showing a disposition position of the cooling fan 5. Specifically, FIG. 5 is a sectional view of the discharge aperture 52 of the cooling fan 5 cut by a plane perpendicular to the lens axis OAx, as seen from the front side.

In FIG. 5, for ease of description, the polarizing plates 352 and 353 are omitted from the illustration.

The cooling fan 5, as shown in FIG. 5, is disposed in a state that, when the projection lens 36 and discharge aperture 52 are cut by the plane perpendicular to the lens optical axis OAx, the height position of a second center CF between an upper end 52A and lower end 52B of the cross-section of the discharge portion 52, and that of the first center CD, approximately coincide with each other.

Consequently, the air discharged from the discharge aperture 52 of the cooling fan 5, after circulating in the horizontal direction via the introduction portion 71, and furthermore, circulating in a direction approximately parallel to the lens optical axis OAx via the discharge portion 72, is caused to blow on the lateral side of the B side member 350B.

According to the embodiment, there are the following advantages.

In the embodiment, the duct 7 configuring the cooling device 4 is disposed in a state that the height position of the first center CD of the discharge portion 72 and that of the lens optical axis OAx differ from one another.

Because of this, it is possible to dispose the discharge portion 72 in a space on the obliquely downward side of the projection lens 36 as seen from the front side, utilizing the fact that the projection lens 36 has an approximately cylindrical shape extending along the lens optical axis OAx. For this reason, it is possible to bring the discharge portion 72 closer to the lens optical axis OAx, in plan view from the upper side, in comparison with the configuration wherein the duct 7 is disposed in a state that the height positions of the first center CD and lens optical axis OAx approximately coincide with each other.

Consequently, even when the B color light side liquid crystal panel 351 is disposed in the position hidden by the projection lens 36 as seen from the front side, as in the embodiment, it is possible to cause the air after circulating through the discharge portion 72 to blow on the lateral side of the B side member 350B, and thereby cause the air to circulate smoothly through both the light incidence side and light emission side of the liquid crystal panel 351 configuring the B side member 350B, and it is possible to effectively cool the same liquid crystal panel 351.

Also, as the side wall portion 7B is provided in the duct 7, it is possible to bring the discharge portion 72 still closer to the lens optical axis OAx, in plan view from the upper side, in comparison with a configuration wherein the side wall portion 7B is not provided in the duct 7 (for example a configuration having a rectangular external shape). For this reason, it is possible to efficiently feed the air to the light incidence side of the liquid crystal panel 351 configuring the B side member 350B, and it is possible to more effectively cool the same liquid crystal panel 351.

Furthermore, by forming the side wall portion 7B of the duct 7 in such a way as to follow the external shape of the projection lens 36, it is possible to increase the flow channel cross-sectional area of the duct 7, and it is possible to sufficiently secure the flow rate of air caused to blow on the lateral side of the B side member 350B.

Also, as the cooling fan 5 is disposed in a state that the height positions of the second center CF and first center CD approximately coincide with each other, it is not necessary, in the duct 7, to form the introduction portion 71, which introduces the air from the cooling fan 5 into the discharge portion 72, in a bent shape. That is, as it is possible to set the flow channel inside the introduction portion 71 to be approximately linear, it is possible to reduce a loss of pressure in the introduction portion 71, and sufficiently secure the volume of air caused to blow on the lateral side of the B side member 350B.

Furthermore, as the cooling fan 5 is disposed in a state that the discharge direction thereof is inclined at the predetermined angle with respect to the lens optical axis OAx, it is possible to increase the angle between the introduction portion 71 and discharge portion 72 in plan view from the upper side, and it is also possible to reduce a loss of pressure between the introduction portion 71 and discharge portion 72.

As the loss of pressure from the duct 7 to the flow channel formation portion 6 is reduced, as heretofore described, it is possible to sufficiently secure the volume of air circulating along the flow channel C, and it is possible to effectively cool all of the members 350R, 350G, and 350B.

The invention is not limited to the embodiment, and a modification, an improvement, or the like, in a range in which it is possible to achieve the advantage of the invention is included in the invention.

In the embodiment, a configuration is such as to cause air to blow on the lateral side of the B side member 350B by the cooling fan 5 and the duct 7, but the invention is not limited to this.

For example, a configuration may be such as to change the disposition positions of the duct 7 and cooling fan 5, and cause air to blow on the lateral side of the R side member 350R.

Also, for example, a configuration may be such as to change the disposition position of each member 350R, 350G, and 350B, and cause air to blow on the lateral side of the G side member 350G.

In the embodiment, the flow channel formation portion 6 is configured in such a way as to cause air to circulate through each member 350R, 350G, and 350B but, for example, it may be configured having an I-shape in plan view which causes air to circulate through only the B side member 350B, or it may be configured having an approximate L-shape in plan view which causes air to circulate through only the members 350B and 350G.

In the embodiment, the invention is applied to a configuration (a tilting projection configuration) wherein the lens optical axis OAx of the projection lens 36 is in the position away from the illumination optical axis Ax to the upper side but, not being limited to this, a configuration may be such that the lens optical axis OAx coincides with the illumination optical axis Ax, and by applying the invention to this kind of configuration too, it is possible to enjoy advantages the same as those of the embodiment.

In the embodiment, the height position of the first center CD is set in a position lower than the height position of the illumination optical axis Ax, but the invention is not limited to this. For example, a configuration may be such that the height positions of the illumination optical axis Ax and first center CD are caused to coincide with each other.

In the embodiment, the cross dichroic prism 354 is employed as a configuration such as to synthesize the R, G, and B color lights emitted from the respective members 350R, 350G, and 350B, but the invention, not being limited to this, may adopt a configuration using a plurality of dichroic mirrors.

In the embodiment, the projector 1 is configured including the three liquid crystal panels 351, but the invention is not limited to this. That is, the invention can also be applied to a projector using one, two, or four or more liquid crystal panels.

In the embodiment, apart from a transmissive liquid crystal panel, a reflective liquid crystal panel may be employed as the optical modulation device.

In the embodiment, only an example of a front projection type projector is given, but the invention can also be applied to a rear type projector which, including a screen, carries out a projection from the rear side of the screen.

The invention is applicable to a projector used for presentation, home theatre, or the like.

What is claimed is:

1. A projector comprising:
a plurality of optical modulation devices configured to modulate incident luminous flux;
a projection optical device configured to project the luminous flux modulated by the plurality of optical modulation devices;
a cooling fan configured to discharge air; and
a duct having a discharge portion in which the discharged from the cooling fan flows along a direction approximately parallel to an optical axis of the projection optical device toward the plurality of optical modulation devices, wherein
the air from the discharge portion cools the optical modulation devices from a lateral side thereof in disposed order, and
the duct is disposed in a position that, in a cross-sectional view of the projection optical device and discharge portion taken along a plane perpendicular to the optical axis, the height position of a first center between the upper end and lower end of the discharge portion differs from the height position of the optical axis.

2. The projector according to claim 1, wherein
the duct includes a side wall portion following the external shape of the projection optical device.

3. The projector according to claim 2, wherein
the cooling fan includes a discharge aperture from which air is discharged, and
the cooling fan is disposed in a position that, in a cross-sectional view of the discharge aperture taken along a plane perpendicular to the optical axis, the height position of a second center between the upper end and lower end of the discharge aperture approximately coincides with the height position of the first center.

4. The projector according to claim 1, wherein
the cooling fan includes a discharge aperture from which air is discharged, and
the cooling fan is disposed in a position that, in a cross-sectional view of the discharge aperture taken along a plane perpendicular to the optical axis, the height position of a second center between the upper end and lower end of the discharge aperture approximately coincides with the height position of the first center.

5. The projector according to claim 1, wherein
the discharge portion is disposed in a position overlapping part of one of the plurality of optical modulation devices in a direction along the optical axis.

* * * * *